US012225284B2

(12) United States Patent
Chaudhri et al.

(10) Patent No.: US 12,225,284 B2
(45) Date of Patent: Feb. 11, 2025

(54) WEARABLE MULTIMEDIA DEVICE AND CLOUD COMPUTING PLATFORM WITH APPLICATION ECOSYSTEM

(71) Applicant: Humane, Inc., San Francisco, CA (US)

(72) Inventors: Imran A. Chaudhri, San Francisco, CA (US); Bethany Bongiorno, San Francisco, CA (US); Shahzad Chaudhri, Arlington, VA (US)

(73) Assignee: Humane, Inc., San Francisco, CA (US)

( * ) Notice: Subject to any disclaimer, the term of this patent is extended or adjusted under 35 U.S.C. 154(b) by 0 days.

(21) Appl. No.: 18/126,958

(22) Filed: Mar. 27, 2023

(65) Prior Publication Data

US 2023/0239567 A1 Jul. 27, 2023

Related U.S. Application Data

(60) Division of application No. 17/175,595, filed on Feb. 12, 2021, which is a continuation of application No.
(Continued)

(51) Int. Cl.
*H04N 23/66* (2023.01)
*G06F 3/16* (2006.01)
(Continued)

(52) U.S. Cl.
CPC ............ *H04N 23/66* (2023.01); *G06F 3/167* (2013.01); *G06Q 20/123* (2013.01);
(Continued)

(58) Field of Classification Search
CPC ...................................................... H04N 23/66
See application file for complete search history.

(56) References Cited

U.S. PATENT DOCUMENTS 9,355,356 B2  5/2016  Weast et al.
9,794,475 B1  10/2017 Tome et al.
(Continued)

FOREIGN PATENT DOCUMENTS

CN  103907357  7/2014
CN  104969205  10/2015
(Continued)

OTHER PUBLICATIONS

Kanel, "Sixth Sense Technology," Thesis for the Bachelor Degree of Engineering in Information and Technology, Centria University of Applied Sciences, May 2014, 46 pages.
(Continued)

*Primary Examiner* — Shivang I Patel
(74) *Attorney, Agent, or Firm* — Fish & Richardson P.C.

(57) ABSTRACT

Systems, methods, devices and non-transitory, computer-readable storage mediums are disclosed for a wearable multimedia device and cloud computing platform with an application ecosystem for processing multimedia data captured by the wearable multimedia device. In an embodiment, a method comprises: receiving, by one or more processors of a cloud computing platform, context data from a wearable multimedia device, the wearable multimedia device including at least one data capture device for capturing the context data; creating a data processing pipeline with one or more applications based on one or more characteristics of the context data and a user request; processing the context data through the data processing pipeline; and sending output of the data processing pipeline to the wearable multimedia device or other device for presentation of the output.

7 Claims, 8 Drawing Sheets

Related U.S. Application Data

15/976,632, filed on May 10, 2018, now Pat. No. 10,924,651.

(60) Provisional application No. 62/504,488, filed on May 10, 2017.

(51) Int. Cl.

| | |
|---|---|
| *G06N 5/022* | (2023.01) |
| *G06Q 20/12* | (2012.01) |
| *G06Q 20/32* | (2012.01) |
| *G06Q 20/40* | (2012.01) |
| *G06T 1/20* | (2006.01) |
| *G06T 11/00* | (2006.01) |
| *G06V 20/00* | (2022.01) |
| *G06V 20/20* | (2022.01) |
| *G11B 27/031* | (2006.01) |
| *H04L 65/61* | (2022.01) |
| *H04L 65/75* | (2022.01) |
| *H04L 67/53* | (2022.01) |
| *H04M 1/60* | (2006.01) |
| *H04M 1/72454* | (2021.01) |
| *H04N 5/28* | (2006.01) |
| *H04N 5/77* | (2006.01) |
| *H04N 9/82* | (2006.01) |
| *H04N 23/661* | (2023.01) |
| *G06N 20/00* | (2019.01) |

(52) U.S. Cl.
CPC ....... *G06Q 20/322* (2013.01); *G06Q 20/3224* (2013.01); *G06Q 20/40145* (2013.01); *G06T 1/20* (2013.01); *G06T 11/00* (2013.01); *G06V 20/20* (2022.01); *G06V 20/35* (2022.01); *G11B 27/031* (2013.01); *H04L 65/61* (2022.05); *H04L 65/764* (2022.05); *H04L 67/53* (2022.05); *H04M 1/6041* (2013.01); *H04M 1/72454* (2021.01); *H04N 5/28* (2013.01); *H04N 5/77* (2013.01); *H04N 9/8205* (2013.01); *H04N 23/661* (2023.01); *G06N 5/022* (2013.01); *G06N 20/00* (2019.01); *H04M 2250/52* (2013.01); *H04M 2250/74* (2013.01)

(56) References Cited

U.S. PATENT DOCUMENTS

| | | | |
|---|---|---|---|
| 10,924,651 | B2 | 2/2021 | Chaudhri et al. |
| 11,652,965 | B2 | 5/2023 | Meier et al. |
| 2002/0083025 | A1 | 6/2002 | Robarts et al. |
| 2002/0085843 | A1 | 7/2002 | Mann |
| 2008/0095468 | A1 | 4/2008 | Klemmer et al. |
| 2009/0238538 | A1 | 9/2009 | Fink et al. |
| 2010/0199232 | A1 | 8/2010 | Mistry et al. |
| 2012/0035934 | A1* | 2/2012 | Cunningham .......... G06F 3/165 704/260 |
| 2012/0041675 | A1 | 2/2012 | Juliver et al. |
| 2012/0245944 | A1 | 9/2012 | Gruber et al. |
| 2014/0253743 | A1 | 9/2014 | Lozam et al. |
| 2014/0281975 | A1 | 9/2014 | Anderson et al. |
| 2014/0337243 | A1 | 11/2014 | Dutt et al. |
| 2015/0029223 | A1 | 1/2015 | Kaino et al. |
| 2015/0181272 | A1 | 6/2015 | Lu et al. |
| 2015/0229750 | A1 | 8/2015 | Zhou et al. |
| 2015/0237300 | A1 | 8/2015 | Mendis et al. |
| 2015/0324181 | A1 | 11/2015 | Segal |
| 2015/0338926 | A1 | 11/2015 | Park et al. |
| 2015/0371215 | A1 | 12/2015 | Zhou et al. |
| 2016/0026423 | A1 | 1/2016 | Zenoff |
| 2016/0189051 | A1 | 6/2016 | Mahmood |
| 2016/0261834 | A1 | 9/2016 | Li et al. |
| 2016/0335506 | A1 | 11/2016 | Renkis |
| 2016/0377722 | A1 | 12/2016 | Lardin et al. |
| 2017/0123487 | A1* | 5/2017 | Hazra .................. G06F 3/0482 |
| 2017/0206899 | A1 | 7/2017 | Bryant et al. |
| 2017/0315519 | A1 | 11/2017 | Laurent et al. |
| 2017/0323481 | A1 | 11/2017 | Tran et al. |
| 2018/0075658 | A1 | 3/2018 | Lanier et al. |
| 2018/0276899 | A1 | 9/2018 | Liao et al. |
| 2018/0332211 | A1 | 11/2018 | Chaudhri et al. |
| 2021/0117680 | A1 | 4/2021 | Chaudhri et al. |
| 2022/0011855 | A1 | 1/2022 | Hazra et al. |
| 2022/0038615 | A1 | 2/2022 | Chaudhri et al. |
| 2023/0417538 | A1 | 12/2023 | Tsurumi |

FOREIGN PATENT DOCUMENTS

| | | |
|---|---|---|
| CN | 105556506 | 5/2016 |
| CN | 105027562 | 2/2019 |
| EP | 3366516 | 8/2018 |
| JP | 2002-133588 | 5/2002 |
| JP | 2009-239466 | 10/2009 |
| JP | 2011-239141 | 11/2011 |
| JP | 2012-221498 | 11/2012 |
| JP | 2013-083985 | 5/2013 |
| JP | 2013-521576 | 6/2013 |
| JP | 2014-132478 | 7/2014 |
| JP | 2016-148968 | 8/2016 |
| JP | 2016-178662 | 10/2016 |
| JP | 2017-016056 | 1/2017 |
| JP | 2017-120329 | 7/2017 |
| JP | 2018-028922 | 2/2018 |
| JP | 2018-180840 | 11/2018 |
| JP | 2019-032495 | 2/2019 |
| KR | 10-2018-0088390 | 8/2018 |
| WO | WO 2014/071254 | 5/2014 |
| WO | WO 2015/127383 | 8/2015 |
| WO | WO 2017/035384 | 3/2017 |
| WO | WO 2017/134886 | 8/2017 |

OTHER PUBLICATIONS

Mann et al., "Telepointer: Hands-Free Completely Self Contained Wearable Visual Augmented Reality without Headwear and without any Infrastructural Reliance", IEEE International Symposium on Wearable Computing, 2000, 4 pages.

Mann, "Wearable Computing: A First Step Toward Personal Imaging," IEEE Computer, Feb. 1997, 30(2):25-32.

Mann, "Wearable, tetherless computer-mediated reality," American Association of Artificial Intelligence Technical Report, Feb. 1996, 62-69, 8 pages.

Metavision.com [online], "Sensularity with a Sixth Sense," available on or before Apr. 7, 2015, via Internet Archive: Wayback Machine URL <http://web.archive.org/web/20170901072037/https://blog.metavision.com/professor-steve-mann-society-of-sensularity-with-a-sixth-sense/> retrieved on Apr. 25, 2023, URL <https://blog.metavision.com/professor-steve-mann-society-of-sensularity-with-a-sixth-sense/>, 4 pages.

Mistry et al., "WUW—wear Ur world: a wearable gestural interface", Proceedings of CHI EA '09 Extended Abstracts on Human Factors in Computing Systems, ACM New York, NY, USA, 5 pages.

Shetty et al., "Sixth Sense Technology," International Journal of Science and Research, Dec. 2014, 3(12):1068-1073.

Blais et al., "3D imaging from theory to practice: the Mona Lisa story." Current Developments in Lens Design and Optical Engineering IX, Aug. 2008, 7060:126-135.

Extended European Search Report in European Appln. No. 18798577, dated Feb. 17, 2021, 10 pages.

Extended European Search Report in European Appln. No. 20826684.1, mailed on Jun. 6, 2023, 12 pages.

International Preliminary Report on Patentability in International Appln. No. PCT/US2020/038505, dated Dec. 30, 2022, 11 pages.

International Preliminary Report on Patentability in PCT Appln. No. PCT/US2018/032089, dated Jan. 21, 2020, 8 pages.

International Search Report and Written Opinion in International Appln. No. PCT/US2018/032089, dated Aug. 13, 2018, 8 pages.

(56) References Cited

OTHER PUBLICATIONS

International Search Report and Written Opinion in International Appln. No. PCT/US2020/038505, dated Sep. 16, 2020, 12 pages.

Krishnamoorthy et al., "Generating natural-language video descriptions using text-mined knowledge," Proceedings of the Twenty-Seventh AAAI Conference on Artificial Intelligence, Jul. 2013, 7 pages.

Searcherp.Techtarget.com [online], "Financial Application," Mar. 2012, retrieved on Feb. 25, 2021, retrieved from URL <https://searcherp.techtarget.com/definition/financial-application>, 4 pages.

Xiao et al., "LumiWatch On-Arm Projected Graphics and Touch Input", Proceedings of the 33rd ACM/IEEE International Conference on Automated Software Engineering, Acmpub27, New York, NY, USA, Apr. 2018, 11 pages.

\* cited by examiner

WEARABLE MULTIMEDIA DEVICE AND CLOUD COMPUTING PLATFORM WITH APPLICATION ECOSYSTEM

CROSS-REFERENCE TO RELATED APPLICATIONS

This application is a divisional application of and claims priority to U.S. patent application Ser. No. 17/175,595, filed Feb. 12, 2021, which is a continuation of U.S. patent application Ser. No. 15/976,632, filed May 10, 2018, which claims the benefit of priority from U.S. Provisional Patent Application No. 62/504,488, for "Cloud Connected Sight Enabled AI Platform with Server Side App Echo System," filed May 10, 2017, the entire contents of each of which are incorporated herein by reference.

TECHNICAL FIELD

This disclosure relates generally to cloud computing and multimedia editing.

BACKGROUND

Modern mobile devices (e.g., smart phones, tablet computers) often include an embedded camera that allows a user to take digital images or videos of spontaneous events. These digital images and video can be stored in an online database associated with a user account to free up memory on the mobile device. Users can share their images and videos with friends and family, and download or stream the images and videos on demand using their various playback devices. These embedded cameras provide significant advantages over conventional digital cameras, which are more bulky and often require more time to set-up a shot.

Despite the convenience of mobile device embedded cameras, there are many important moments that are not captured by these devices because the moments occur too quickly or the user simply forgets to take an image or video because they are emotionally caught up in the moment.

SUMMARY

Systems, methods, devices and non-transitory, computer-readable storage mediums are disclosed for a wearable multimedia device and cloud computing platform with an application ecosystem for processing multimedia data captured by the wearable multimedia device.

In an embodiment, a method comprises: receiving, by one or more processors of a cloud computing platform, context data from a wearable multimedia device, the wearable multimedia device including at least one data capture device for capturing the context data; creating, by the one or more processors, a data processing pipeline with one or more applications based on one or more characteristics of the context data and a user request; processing, by the one or more processors, the context data through the data processing pipeline; and sending, by the one or more processors, output of the data processing pipeline to the wearable multimedia device or other device for presentation of the output.

In an embodiment, a system comprises: one or more processors; memory storing instructions that when executed by the one or more processors, causes the one or more processors to perform operations comprising: receiving, by one or more processors of a cloud computing platform, context data from a wearable multimedia device, the wearable multimedia device including at least one data capture device for capturing the context data; creating, by the one or more processors, a data processing pipeline with one or more applications based on one or more characteristics of the context data and a user request; processing, by the one or more processors, the context data through the data processing pipeline; and sending, by the one or more processors, output of the data processing pipeline to the wearable multimedia device or other device for presentation of the output.

In an embodiment, a non-transitory, computer-readable storage medium comprises instructions for: receiving, by one or more processors of a cloud computing platform, context data from a wearable multimedia device, the wearable multimedia device including at least one data capture device for capturing the context data; creating, by the one or more processors, a data processing pipeline with one or more applications based on one or more characteristics of the context data and a user request; processing, by the one or more processors, the context data through the data processing pipeline; and sending, by the one or more processors, output of the data processing pipeline to the wearable multimedia device or other device for presentation of the output.

Particular embodiments disclosed herein provide one or more of the following advantages. A wearable multimedia device captures multimedia data of spontaneous moments and transactions with minimal interaction by the user. The multimedia data is automatically edited and formatted on a cloud computing platform based on user preferences, and then made available to the user for replay on a variety of user playback devices. In an embodiment, the data editing and/or processing is performed by an ecosystem of applications that are proprietary and/or provided/licensed from third party developers. The application ecosystem provides various access points (e.g., a website, portal, API) that allow the third party developers to upload, verify and update their applications. The cloud computing platform automatically builds a custom processing pipeline for each multimedia data stream using one or more of the ecosystem applications, user preferences and other information (e.g., the type or format of the data, the quantity and quality of the data).

The details of the disclosed embodiments are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Overview

A wearable multimedia device is a lightweight, small form factor, battery-powered device that can be attached to a user's clothing or an object using a tension clasp, interlocking pin back, magnet or any other attachment mechanism. The wearable multimedia device includes a digital image capture device (e.g., 180° FOV with optical image stabilizer (OIS)) that allows a user to spontaneously capture multimedia data (e.g., video, audio, depth data) of life events ("moments") and document transactions (e.g., financial transactions) with minimal user interaction or device set-up. The multimedia data ("context data") captured by the wireless multimedia device is uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, image gallery) that can be downloaded and replayed on the wearable multimedia device and/or any other playback device. For example, the cloud computing platform can transform video data and audio data into any desired filmmaking style (e.g., documentary, lifestyle, candid, photojournalism, sport, street) specified by the user.

In an embodiment, the context data is processed by server computer(s) of the cloud computing platform based on user preferences. For example, images can be color graded, stabilized and cropped perfectly to the moment the user wants to relive based on the user preferences. The user preferences can be stored in a user profile created by the user through an online account accessible through a website or portal, or the user preferences can be learned by the platform over time (e.g., using machine learning). In an embodiment, the cloud computing platform is a scalable distributed computing environment. For example, the cloud computing platform can be a distributed streaming platform (e.g., Apache Kafka™) with real-time streaming data pipelines and streaming applications that transform or react to streams of data.

In an embodiment, the user can start and stop a context data capture session on the wearable multimedia device with a simple touch gesture (e.g., a tap or swipe), by speaking a command or any other input mechanism. All or portions of the wearable multimedia device can automatically power down when it detects that it is not being worn by the user using one or more sensors (e.g., proximity sensor, optical sensor, accelerometers, gyroscopes). In an embodiment, the device can include photovoltaic surface technology to sustain battery life and inductive charging circuitry (e.g., Qi) to allow for inductive charging on charge mats and wireless over-the-air (OTA) charging.

The context data can be encrypted and compressed and stored in an online database associated with a user account using any desired encryption or compression technology. The context data can be stored for a specified period of time that can be set by the user. The user can be provided through a website, portal or mobile application with opt-in mechanisms and other tools for managing their data and data privacy.

In an embodiment, the context data includes point cloud data to provide three-dimensional (3D) surface mapped objects that can be processed using, for example, augmented reality (AR) and virtual reality (VR) applications in the application ecosystem. The point cloud data can be generated by a depth sensor (e.g., LiDAR or Time of Flight (TOF)) embedded on the wearable multimedia device.

In an embodiment, the wearable multimedia device includes a Global Navigation Satellite System (GNSS) receiver (e.g., Global Positioning System (GPS)) and one or more inertial sensors (e.g., accelerometers, gyroscopes) for determining the location and orientation of the user wearing the device when the context data was captured. In an embodiment, one or more images in the context data can be used by a localization application, such as a visual odometry application, in the application ecosystem to determine the position and orientation of the user.

In an embodiment, the wearable multimedia device can also include one or more environmental sensors, including but not limited to: an ambient light sensor, magnetometer, pressure sensor, voice activity detector, etc. This sensor data can be included in the context data to enrich a content presentation with additional information that can be used to capture the moment.

In an embodiment, the wearable multimedia device can include one or more biometric sensors, such as a heart rate sensor, fingerprint scanner, etc. This sensor data can be included in the context data to document a transaction or to indicate the emotional state of the user during the moment (e.g., elevated heart rate could indicate excitement or fear).

In an embodiment, the wearable multimedia device includes a headphone jack connecting a headset or earbuds, and one or more microphones for receiving voice command and capturing ambient audio. In an alternative embodiment, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, laser projector, television and other wearable devices).

In an embodiment, the wearable multimedia device includes a wireless transceiver and communication protocol stacks for a variety of communication technologies, including WiFi, 3G, 4G and 5G communication technologies. In an embodiment, the headset or earbuds also include sensors (e.g., biometric sensors, inertial sensors) that provide information about the direction the user is facing, to provide commands with head gestures, etc. In an embodiment, the camera direction can be controlled by the head gestures, such that the camera view follows the user's view direction. In an embodiment, the wearable multimedia device can be embedded in or attached to the user's glasses.

In an embodiment, the wearable multimedia device includes a laser projector (or can be wired or wirelessly coupled to an external laser projector) that allows the user to replay a moment on a surface such as a wall or table top. In another embodiment, the wearable multimedia device includes an output port that can connect to a laser projector or other output device.

In an embodiment, the wearable multimedia capture device includes a touch surface responsive to touch gestures (e.g., a tap, multi-tap or swipe gesture). The wearable multimedia device may include a small display for presenting information and one or more light indicators to indicate on/off status, power conditions or any other desired status.

In an embodiment, the cloud computing platform can be driven by context-based gestures (e.g., air gesture) in combination with speech queries, such as the user pointing to an object in their environment and saying: "What is that building?" The cloud computing platform uses the air gesture to narrow the scope of the viewport of the camera and isolate the building. One or more images of the building are captured and sent to the cloud computing platform where an image recognition application can run an image query and store or return the results to the user. Air and touch gestures can also be performed on a projected ephemeral display, for example, responding to user interface elements.

In an embodiment, the context data can be encrypted on the device and on the cloud computing platform so that only the user or any authorized viewer can relive the moment on a connected screen (e.g., smartphone, computer, television, etc.) or as a laser projection on a surface. An example architecture for the wearable multimedia device is described in reference to FIG. 8.

In addition to personal life events, the wearable multimedia device simplifies the capture of financial transactions that are currently handled by smartphones. The capture of every day transactions (e.g., business transactions, micro transactions) is made simpler, faster and more fluid by using sight assisted contextual awareness provided by the wearable multimedia device. For example, when the user engages in a financial transaction (e.g., making a purchase), the wearable multimedia device will generate data memorializing the financial transaction, including a date, time, amount, digital images or video of the parties, audio (e.g., user commentary describing the transaction) and environment data (e.g., location data). The data can be included in a multimedia data stream sent to the cloud computing platform, where it can be stored online and/or processed by one or more financial applications (e.g., financial management, accounting, budget, tax preparation, inventory, etc.).

In an embodiment, the cloud computing platform provides graphical user interfaces on a website or portal that allow various third party application developers to upload, update and manage their applications in an application ecosystem. Some example applications can include but are not limited to: personal live broadcasting (e.g., Instagram™ Life, Snapchat™), senior monitoring (e.g., to ensure that a loved one has taken their medicine), memory recall (e.g., showing a child's soccer game from last week) and personal guide (e.g., AI enabled personal guide that knows the location of the user and guides the user to perform an action).

In an embodiment, the wearable multimedia device includes one or more microphones and a headset. In some embodiments, the headset wire includes the microphone. In an embodiment, a digital assistant is implemented on the wearable multimedia device that responds to user queries, requests and commands. For example, the wearable multimedia device worn by a parent captures moment context data for a child's soccer game, and in particular a "moment" where the child scores a goal. The user can request (e.g., using a speech command) that the platform create a video clip of the goal and store it in their user account. Without any further actions by the user, the cloud computing platform identifies the correct portion of the moment context data (e.g., using face recognition, visual or audio cues) when the goal is scored, edits the moment context data into a video clip, and stores the video clip in a database associated with the user account.

Example Operating Environment

Figure 1:
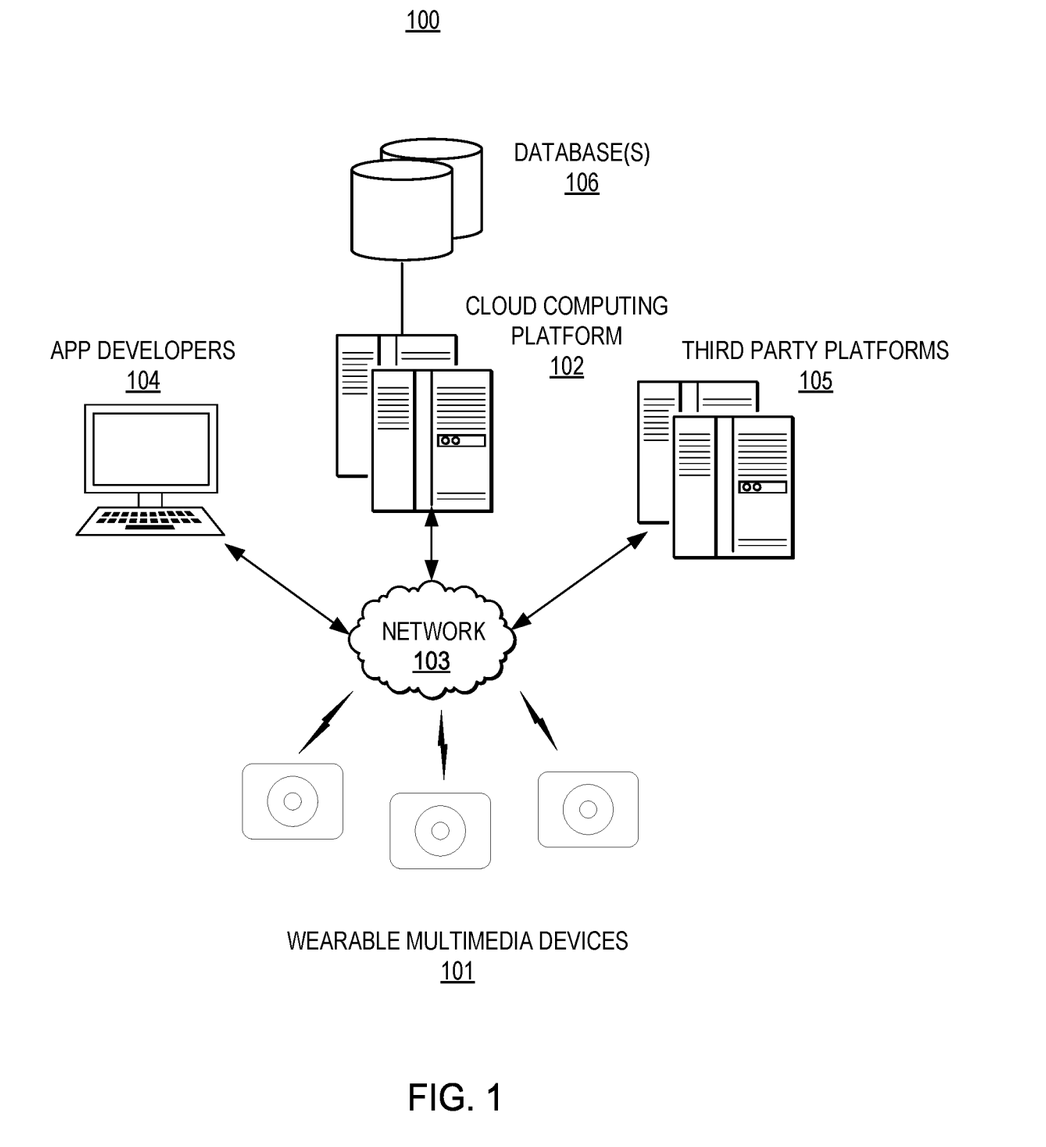
FIG. 1 is a block diagram of an operating environment for a wearable multimedia device and cloud computing platform with an application ecosystem for processing multimedia data captured by the wearable multimedia device, according to an embodiment

FIG. 1 is a block diagram of an operating environment for a wearable multimedia device and cloud computing platform with an application ecosystem for processing multimedia data captured by the wearable multimedia device, according to an embodiment. Operating environment 100 includes wearable multimedia devices 101, cloud computing platform 102, network 103, application ("app") developers 104 and third party platforms 105. Cloud computing platform 102 is coupled to one or more databases 106 for storing context data uploaded by wearable multimedia devices 101.

As previously described, wearable multimedia devices 101 are lightweight, small form factor, battery-powered devices that can be attached to a user's clothing or an object using a tension clasp, interlocking pin back, magnet or any other attachment mechanism. Wearable multimedia devices 101 include a digital image capture device (e.g., 180° FOV with OIS) that allows a user to spontaneously capture multimedia data (e.g., video, audio, depth data) of "moments" and documenting every day transactions (e.g., financial transactions) with minimal user interaction or device set-up. The context data captured by wireless multimedia devices 101 are uploaded to cloud computing platform 102. Cloud computing platform 101 includes an application ecosystem that allows the context data to be processed, edited and formatted by one or more server side applications into any desired presentation format (e.g., single image, image stream, video clip, audio clip, multimedia presentation, images gallery) that can be downloaded and replayed on the wearable multimedia device and/or other playback device.

By way of example, at a child's birthday party a parent can clip the wearable multimedia device on their clothing (or attached the device to a necklace or chain and wear around their neck) so that the camera lens is facing in their view direction. The camera includes 180° FOV that allows the camera to capture almost everything that the user is currently seeing. The user can start recording by simply tapping the surface of the device or pressing a button. No additional set-up is required. A multimedia data stream (e.g., video with audio) is recorded that captures the special moments of the birthday (e.g., blowing out the candles). This "context data" is sent to cloud computing platform 102 in real-time through a wireless network (e.g., WiFi, cellular). In an embodiment, the context data is stored on the wearable multimedia device so that it can be uploaded at a later time. In another embodiment, the user can transfer the context data to another device (e.g., personal computer hard drive, smartphone, tablet computer, thumb drive) and upload the context data to cloud computing platform 102 at a later time using an application.

In an embodiment, the context data is processed by one or more applications of an application ecosystem hosted and managed by cloud computing platform 102. Applications can be accessed through their individual application programming interfaces (APIs). A custom distributed streaming pipeline is created by cloud computing platform 102 to process the context data based on one or more of the data type, data quantity, data quality, user preferences, templates and/or any other information to generate a desired presentation based on user preferences. In an embodiment, machine learning technology can be used to automatically select suitable applications to include in the data processing pipeline with or without user preferences. For example, historical user context data stored in a database (e.g., NoSQL database) can be used to determine user preferences for data processing using any suitable machine learning technology (e.g., deep learning or convolutional neural networks).

In an embodiment, the application ecosystem can include third party platforms 105 that process context data. Secure sessions are set-up between cloud computing platform 102 and third party platforms 105 to send/receive context data. This design allows third party app providers to control access to their application and to provide updates. In other embodiments, the applications are run on servers of cloud computing platform 102 and updates are sent to cloud computing platform 102. In the latter embodiment, app developers 104 can use an API provided by cloud computing platform 102 to upload and update applications to be included in the application ecosystem.

Example Data Processing System

Figure 2:
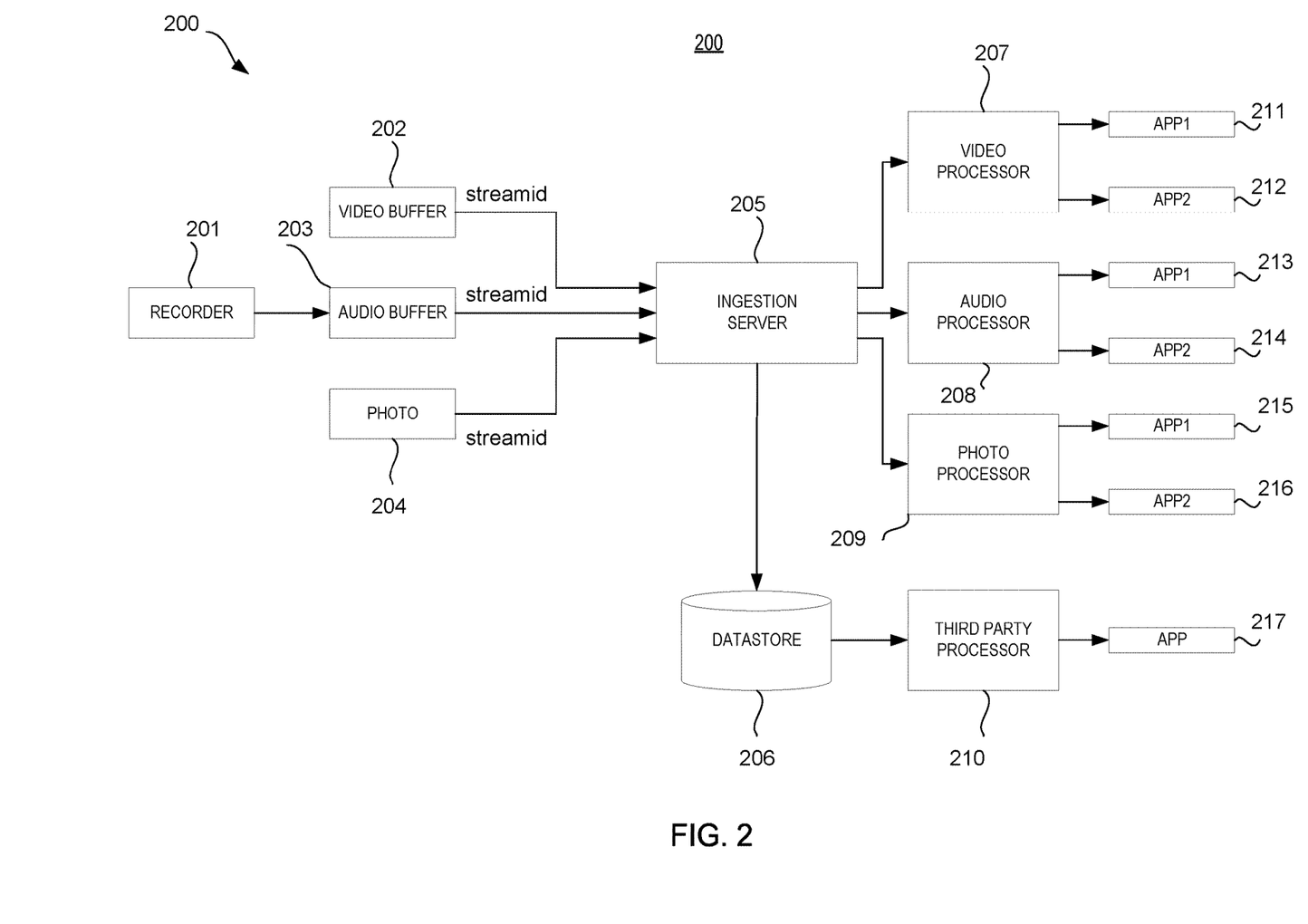
FIG. 2 is a block diagram of a data processing system implemented by the cloud computing platform of FIG. 1, according to an embodiment.

FIG. 2 is a block diagram of a data processing system implemented by the cloud computing platform of FIG. 1, according to an embodiment. Data processing system 200 includes recorder 201, video buffer 202, audio buffer 203, photo buffer 204, ingestion server 205, data store 206, video processor 207, audio processor 208, photo processor 209 and third party processor 210.

A recorder 201 (e.g., a software application) running on a wearable multimedia device records video, audio and photo data ("context data") captured by a camera and audio subsystem, and stores the data in buffers 202, 203, 204, respectively. This context data is then sent (e.g., using wireless OTA technology) to ingestion server 205 of cloud computing platform 102. In an embodiment, the data can be sent in separate data streams each with a unique stream identifier (streamid). The streams are discrete pieces of data that may contain the following example attributes: location (e.g., latitude, longitude), user, audio data, video stream of varying duration and N number of photos. A stream can have a duration of 1 to MAXSTREAM_LEN seconds, where in this example MAXSTREAM_LEN=20 seconds.

Ingestion server 205 ingests the streams and creates a stream record in data store 206 to store the results of processors 207-209. In an embodiment, the audio stream is processed first and is used to determine the other streams that are needed. Ingestion server 205 sends the streams to the appropriate processor 207-209 based on streamid. For example, the video stream is sent to video processor 207, the audio stream is sent to audio processor 208 and the photo stream is sent to photo processor 209. In an embodiment, at least a portion of data collected from the wearable multimedia device (e.g., image data) is processed into metadata and encrypted so that it can be further processed by a given application and sent back to the wearable multimedia device or other device.

Processors 207-209 can run proprietary or third party applications as previously described. For example, video processor 207 can be a video processing server that sends raw video data stored in video buffer 202 to a set of one or more image processing/editing applications 211, 212 based on user preferences or other information. Processor 207 sends requests to applications 211, 212, and returns the results to ingestion server 205. In an embodiment, third party processor 210 can process one or more of the streams using its own processor and application. In an another example, audio processor 208 can be an audio processing server that sends speech data stored in audio buffer 203 to a speech-to-text converter application 213.

Example Scene Identification Application

Figure 3:
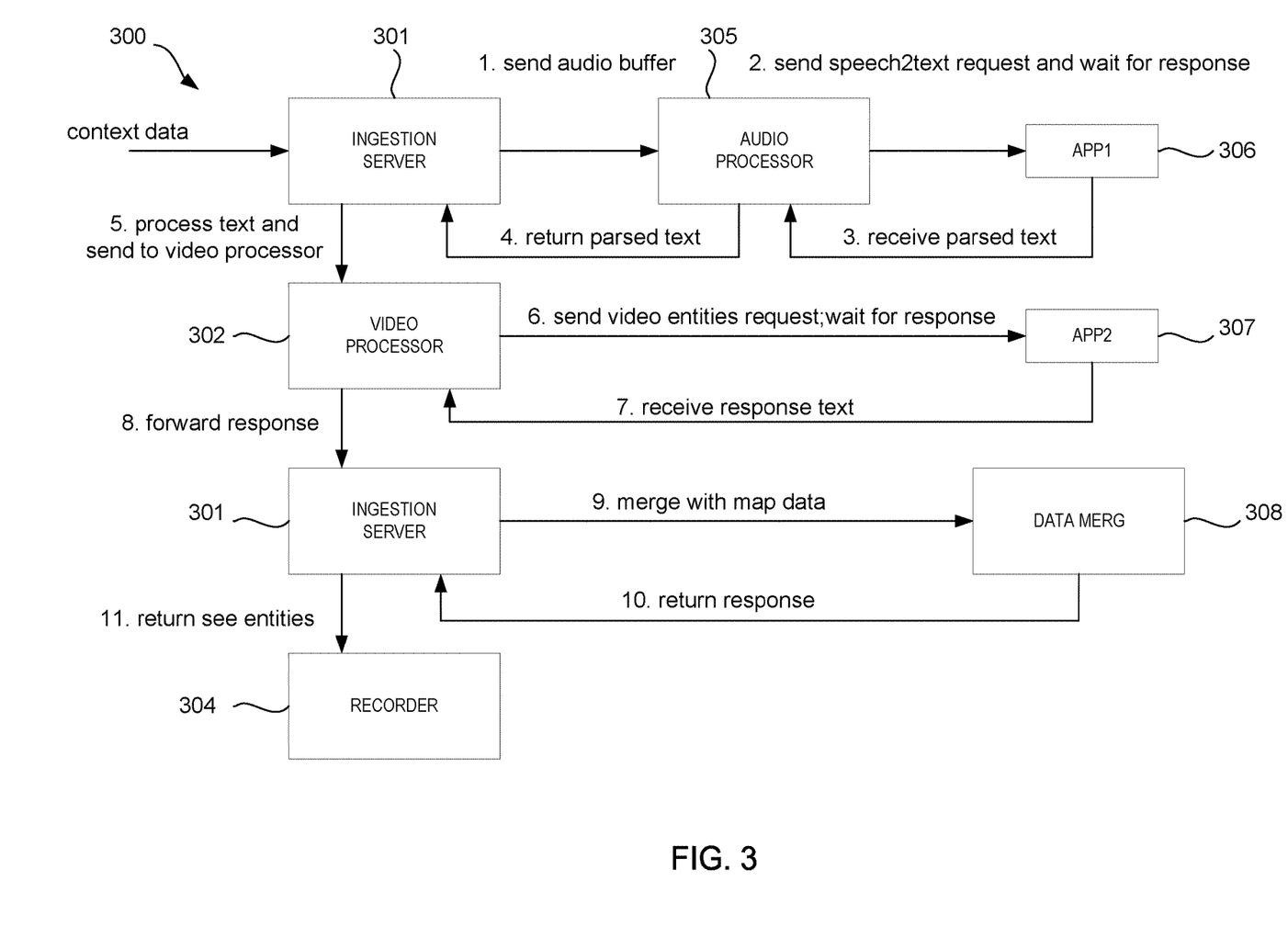
FIG. 3 is a block diagram of a data processing pipeline for processing a context data stream, according to an embodiment.

FIG. 3 is a block diagram of a data processing pipeline for processing a context data stream, according to an embodiment. In this embodiment, data processing pipeline 300 is created and configured to determine what the user is seeing based on the context data captured by a wearable multimedia device worn by the user. Ingestion server 301 receives an audio stream (e.g., including user commentary) from audio buffer 203 of wearable multimedia device and sends the audio stream to audio processor 305. Audio processor 305 sends the audio stream to app 306 which performs speech-to-text conversion and returns parsed text to audio processor 305. Audio processor 305 returns the parsed text to ingestion server 301.

Video processor 302 receives the parsed text from ingestion server 301 and sends a requests to video processing app 307. Video processing app 307 identifies objects in the video scene and uses the parsed text to label the objects. Video processing app 307 sends a response describing the scene (e.g., labeled objects) to video processor 302. Video processor then forwards the response to ingestion server 301. Ingestion server 301 sends the response to data merge process 308, which merges the response with the user's location, orientation and map data. Data merge process 308 returns a response with a scene description to recorder 304 on the wearable multimedia device. For example, the response can include text describing the scene as the child's birthday party, including a map location and a description of objects in the scene (e.g., identify people in the scene). Recorder 304 associates the scene description with the multimedia data (e.g., using a streamid) stored on the wearable multimedia device. When the user recalls the data, the data is enriched with the scene description.

In an embodiment, data merge process 308 may use more than just location and map data. There can also be a notion of ontology. For example, the facial features of the user's Dad captured in an image can be recognized by the cloud computing platform, and be returned as "Dad" rather than the user's name, and an address such as "555 Main Street, San Francisco, CA" can be returned as "Home." The ontology can be specific to the user and can grow and learn from the user's input.

Example Transportation Application

Figure 4:
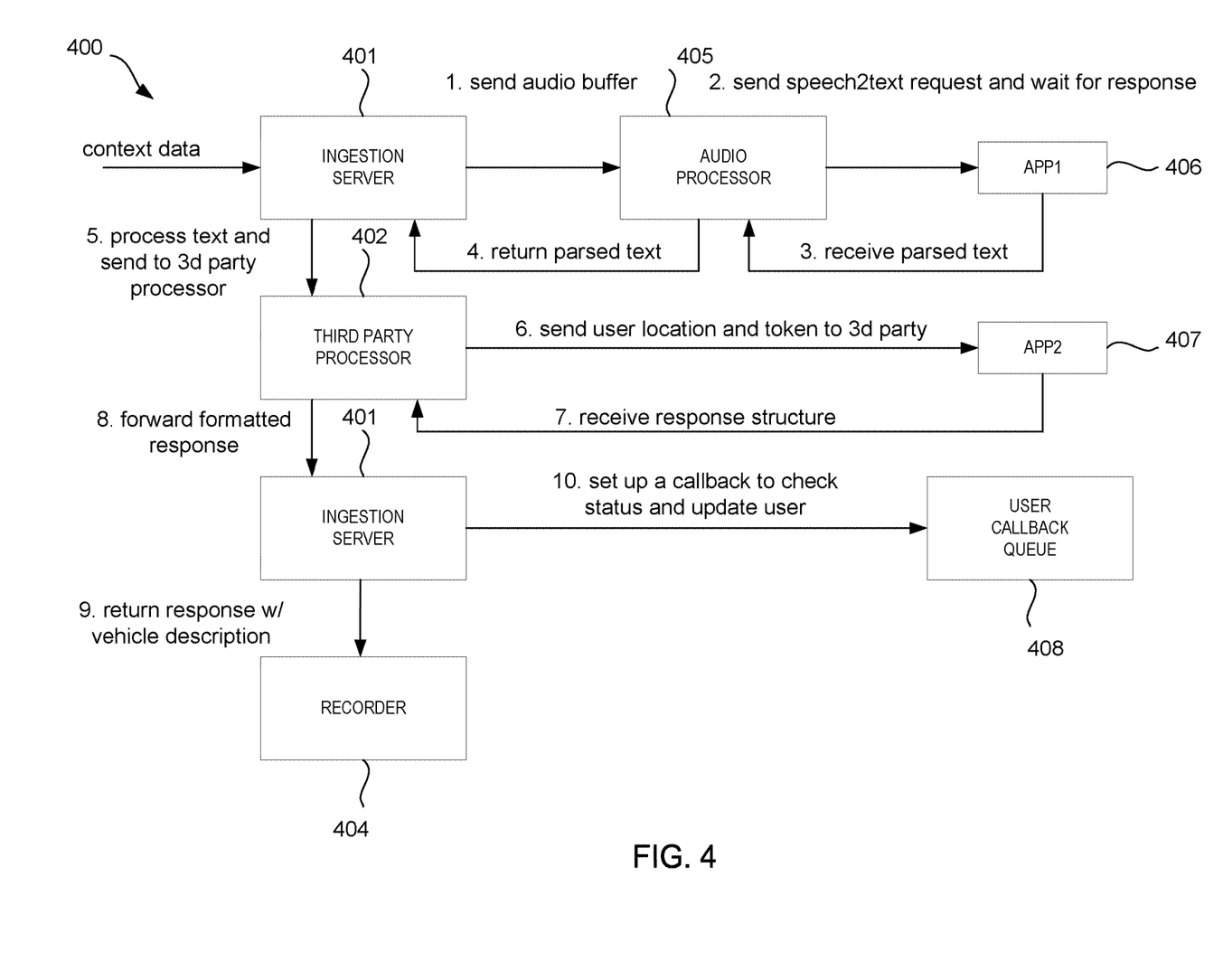
FIG. 4 is a block diagram of another data processing for processing a context data stream for a transportation application, according to an embodiment.

FIG. 4 is a block diagram of another data processing for processing a context data stream for a transportation application, according to an embodiment. In this embodiment, data processing pipeline 400 is created to call a transportation company (e.g., Uber®, Lyft®) to get a ride home. Context data from a wearable multimedia device is received by ingestion server 401 and an audio stream from an audio buffer 203 is sent to audio processor 405. Audio processor 405 sends the audio stream to app 406, which converts the speech to text. The parsed text is returned to audio processor 405, which returns the parsed text to ingestion server 401 (e.g., a user speech request for transportation). The processed text is sent to third party processor 402. Third party processor 402 sends the user location and a token to a third party application 407 (e.g., Uber® or Lyft™® application). In an embodiment, the token is an API and authorization token used to broker a request on behalf of the user.

Application 407 returns a response data structure to third party processor 402, which is forwarded to ingestion server 401. Ingestion server 401 checks the ride arrival status (e.g., ETA) in the response data structure and sets up a callback to the user in user callback queue 408. Ingestion server 401 returns a response with a vehicle description to recorder 404, which can be spoken to the user by a digital assistant through a loudspeaker on wearable multimedia device, or through the user's headphones or earbuds via a wired or wireless connection.

Figure 5:
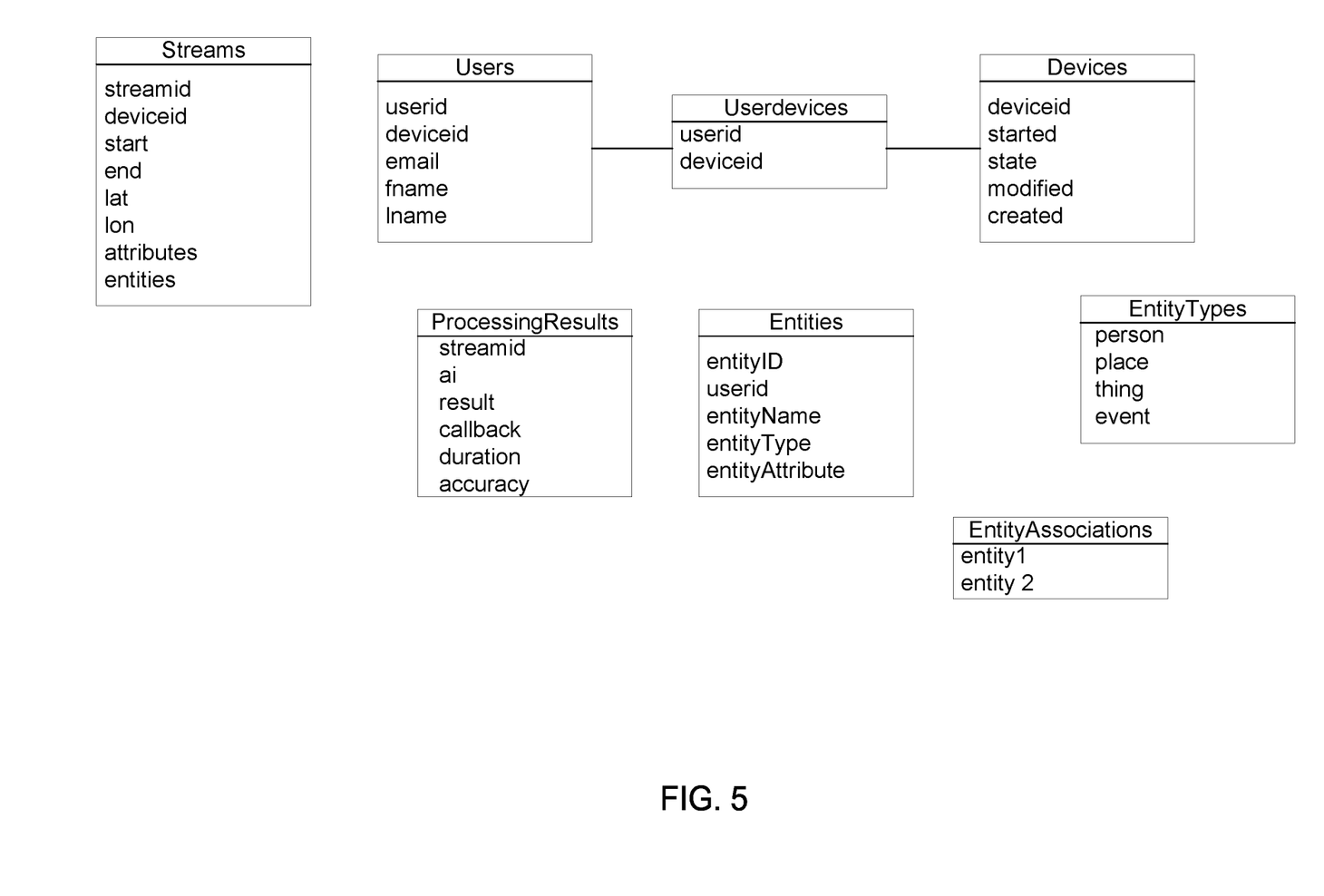
FIG. 5 illustrates data objects used by the data processing system of FIG. 2, according to an embodiment.

FIG. 5 illustrates data objects used by the data processing system of FIG. 2, according to an embodiment. The data objects are part of software component infrastructure instantiated on the cloud computing platform. A "streams" object includes the data streamid, deviceid, start, end, lat, lon, attributes and entities. "Streamid" identifies the stream (e.g., video, audio, photo), "deviceid" identifies the wearable multimedia device (e.g., a mobile device ID), "start" is the start time of the context data stream, "end" is the end time of the context data stream, "lat" is the latitude of the wearable multimedia device, "lon" is the longitude of the wearable multimedia device, "attributes" include, for example, birthday, facial points, skin tone, audio characteristics, address, phone number, etc., and "entities" make up an ontology. For example, the name "John Do" would be mapped to "Dad" or "Brother" depending on the user.

A "Users" object includes the data userid, deviceid, email, fname and lname. Userid identifies the user with a unique identifier, deviceid identifies the wearable device with a unique identifier, email is the user's registered email address, fname is the user's first name and lname is the user's last name. A "Userdevices" object includes the data userid and deviceid. A "devices" object includes the data deviceid, started, state, modified and created. In an embodiment, deviceid is a unique identifier for the device (e.g., distinct from a MAC address). Started is when the device was first started. State is on/off/sleep. Modified is the last modified date, which reflects the last state change or operating system (OS) change. Created is the first time the device was turned on.

A "ProcessingResults" object includes the data streamid, ai, result, callback, duration an accuracy. In an embodiment, streamid is each user stream as a Universally Unique Identifier (UUID). For example, a stream that was started from 8:00 AM to 10:00 AM will have id:15h158dhb4 and a stream that starts from 10:15 AM to 10:18 AM will have a UUID that was contacted for this stream. AI is the identifier for the platform application that was contacted for this stream. Result is the data sent from the platform application. Callback is the callback that was used (versions can change hence the callback is tracked in case the platform needs to replay the request). Accuracy is the score for how accurate the result set is. In an embodiment, processing results can be used for a lot of things, such as 1) to inform the merge server of the full set of results, 2) determine the fastest ai so that user experience can be enhanced, and 3) determine the most accurate ai. Depending on the use case, one may favor speed over accuracy or vice versa.

An "Entities" object includes the data entityID, userID, entityName, entityType and entityAttribute. EntityID is a UUID for the entity and an entity having multiple entries where the entityID references the one entity. For example, "Barack Obama" would have an entityID of 144, which could be linked in an associations table to POTUS44 or "Barack Hussein Obama" or "President Obama." UserID identifies the user that the entity record was made for. EntityName is the name that the userID would call the entity.

For example, Malia Obama's entityName for entityID 144 could be "Dad" or "Daddy." EntityType is a person, place or thing. EntityAttribute is an array of attributes about the entity that are specific to the userID's understanding of that entity. This maps entities together so that when, for example, Malia makes the speech query: "Can you see Dad?", the cloud computing platform can translate the query to Barack Hussein Obama and use that in brokering requests to third parties or looking up information in the system.

Example Processes

Figure 6:
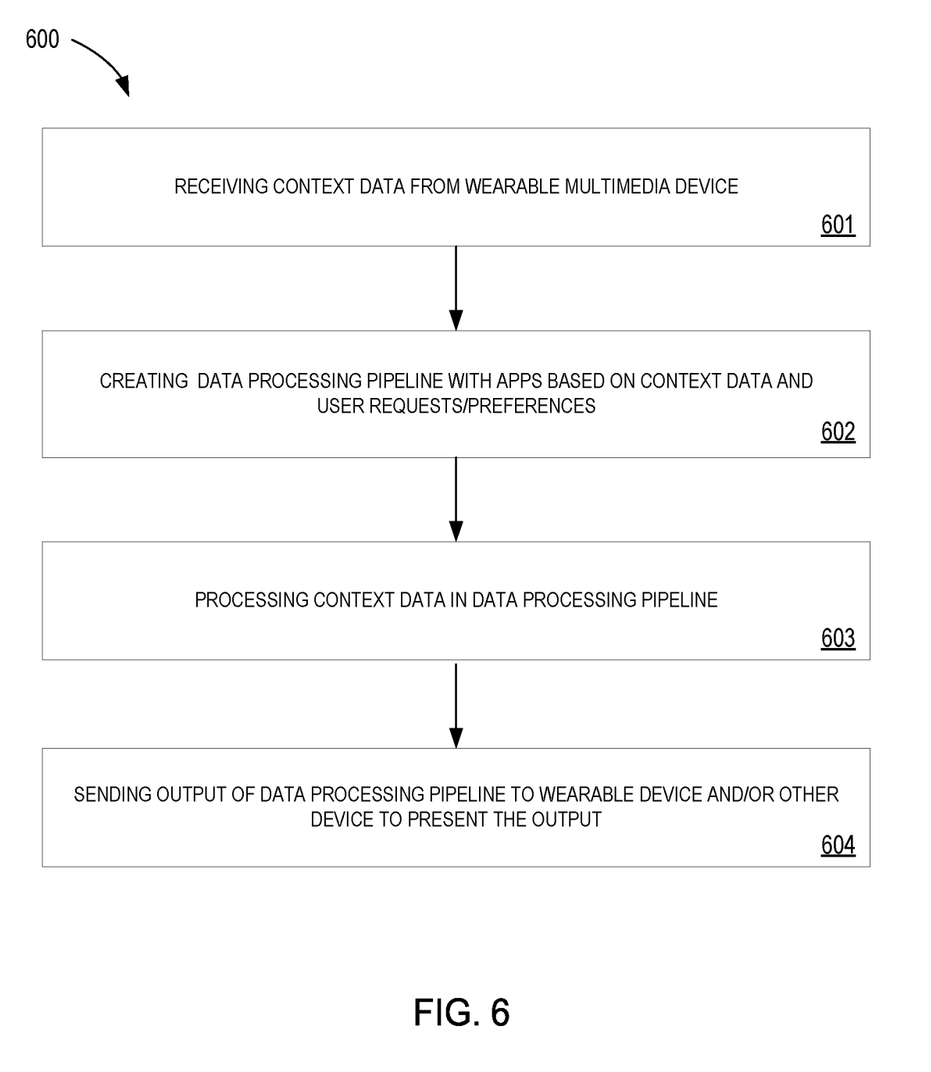
FIG. 6 is flow diagram of a data pipeline process, according to an embodiment.

FIG. 6 is flow diagram of a data pipeline process, according to an embodiment. Process 600 can implemented using wearable multimedia devices 101 and cloud computing platform 102 described in reference to FIGS. 1-5.

Process 600 can begin by receiving context data from a wearable multimedia device (601). For example, the context data can include video, audio and still images captured by a camera and audio subsystem of the wearable multimedia device.

Process 600 can continue by creating (e.g., instantiating) a data processing pipeline with applications based on the context data and user requests/preferences (602). For example, based in user requests or preferences, and also based on the data type (e.g., audio, video, photo), one or more applications can be logically connected to form data processing pipeline to process the context data into a presentation to be playback on the wearable multimedia device or another device.

Process 600 can continue by processing the context data in the data processing pipeline (603). For example, speech from user commentary during a moment or transaction can be converted into text, which is then used to label objects in a video clip.

Process 600 can continue by sending the output of the data processing pipeline to the wearable multimedia device and/or other playback device (604).

Example Cloud Computing Platform Architecture

Figure 7:
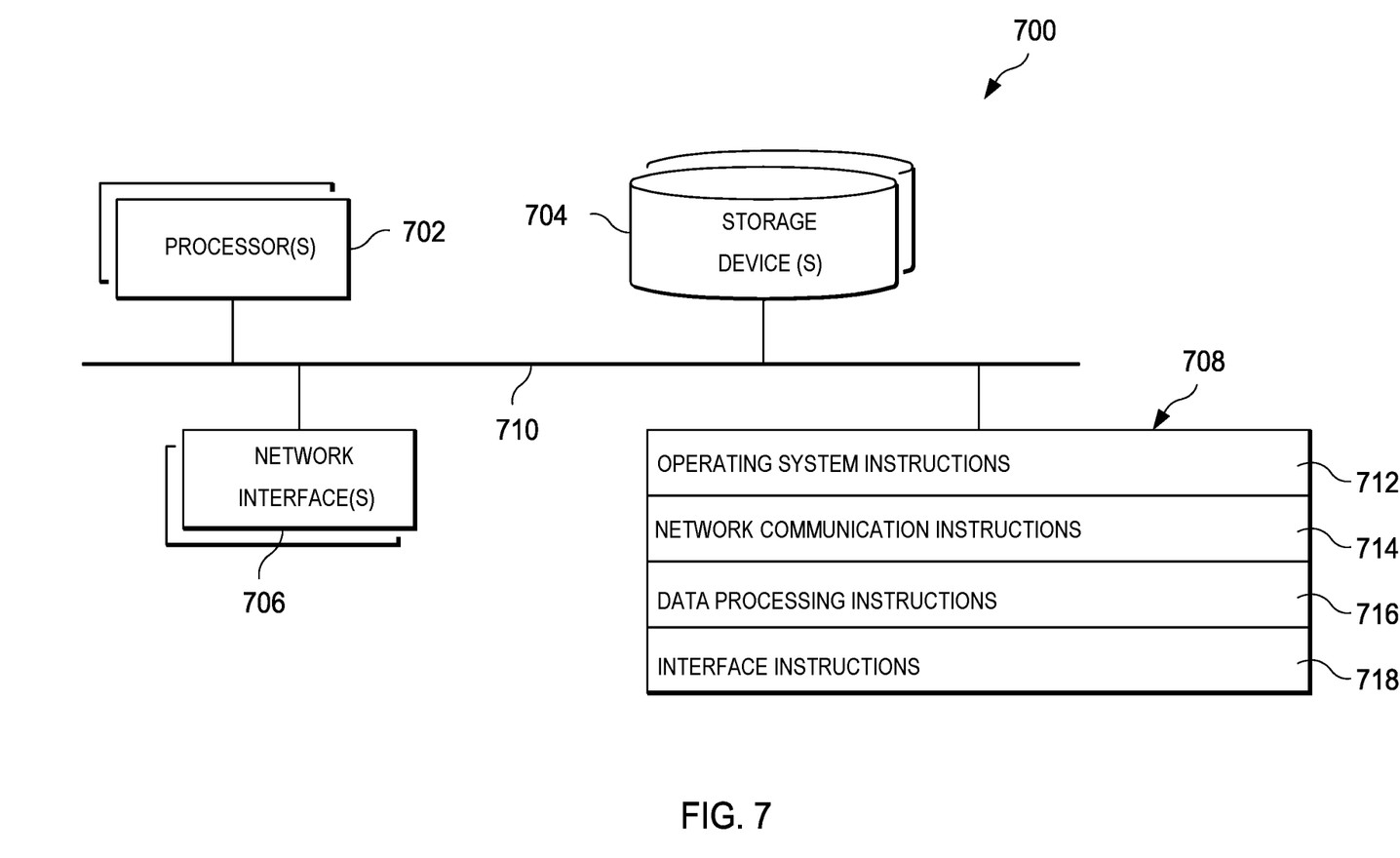
FIG. 7 is an architecture for the cloud computing platform, according to an embodiment.

FIG. 7 is an example architecture 700 for cloud computing platform 102 described in reference to FIGS. 1-6, according to an embodiment. Other architectures are possible, including architectures with more or fewer components. In some implementations, architecture 700 includes one or more processor(s) 702 (e.g., dual-core Intel® Xeon® Processors), one or more network interface(s) 706, one or more storage device(s) 704 (e.g., hard disk, optical disk, flash memory) and one or more computer-readable medium(s) 708 (e.g., hard disk, optical disk, flash memory, etc.). These components can exchange communications and data over one or more communication channel(s) 710 (e.g., buses), which can utilize various hardware and software for facilitating the transfer of data and control signals between components.

The term "computer-readable medium" refers to any medium that participates in providing instructions to processor(s) 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium(s) 708 can further include operating system 712 (e.g., Mac OS® server, Windows®

NT server, Linux Server), network communication module 714, interface instructions 716 and data processing instructions 718.

Operating system 712 can be multi-user, multiprocessing, multitasking, multithreading, real time, etc. Operating system 712 performs basic tasks, including but not limited to: recognizing input from and providing output to devices 702, 704, 706 and 708; keeping track and managing files and directories on computer-readable medium(s) 708 (e.g., memory or a storage device); controlling peripheral devices; and managing traffic on the one or more communication channel(s) 710. Network communications module 714 includes various components for establishing and maintaining network connections (e.g., software for implementing communication protocols, such as TCP/IP, HTTP, etc.) and for creating a distributed streaming platform using, for example, Apache Kafka™. Data processing instructions 716 include server-side or backend software for implementing the server-side operations, as described in reference to FIGS. 1-6. Interface instructions 718 includes software for implementing a web server and/or portal for sending and receiving data to and from wearable multimedia devices 101, third party application developers 104 and third party platforms 105, as described in reference to FIG. 1.

Architecture 700 can be included in any computer device, including one or more server computers in a local or distributed network each having one or more processing cores. Architecture 700 can be implemented in a parallel processing or peer-to-peer infrastructure or on a single device with one or more processors. Software can include multiple software components or can be a single body of code.

Example Wearable Multimedia Device Architecture

Figure 8:
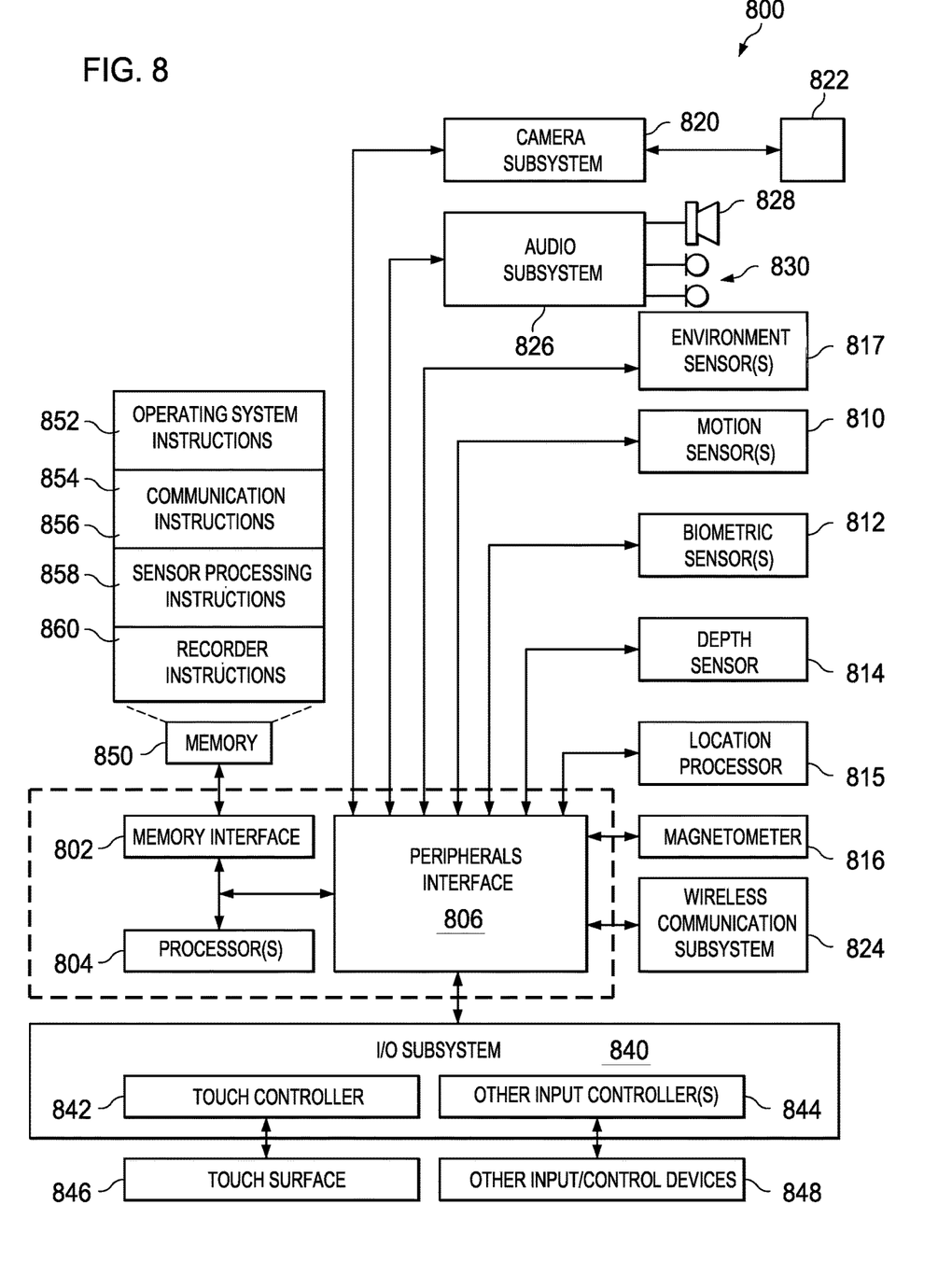
FIG. 8 is an architecture for the wearable multimedia device, according to an embodiment.

FIG. 8 is a block diagram of example architecture 800 for a wearable multimedia device implementing the features and processes described in reference to FIGS. 1-6. Architecture 800 may be implemented in any wearable multimedia device 101 for implementing the features and processors described in reference to FIGS. 1-6. Architecture 800 may include memory interface 802, data processor(s), image processor(s) or central processing unit(s) 804, and peripherals interface 806. Memory interface 802, processor(s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functions. For example, motion sensor(s) 810, biometric sensor(s) 812, depth sensor 814 may be coupled to peripherals interface 806 to facilitate motion, orientation, biometric and depth detection functions. In some implementations, motion sensor(s) 810 (e.g., an accelerometer, rate gyroscope) may be utilized to detect movement and orientation of the wearable multimedia device.

Other sensors may also be connected to peripherals interface 806, such as environmental sensor(s) (e.g., temperature sensor, barometer, ambient light) to facilitate environment sensing functions. For example, a biometric sensor can detect fingerprints, face recognition, heart rate and other fitness parameters. In an embodiment, a haptic motor (not shown) can be coupled to the peripheral interface, which can provide vibration patterns as haptic feedback to the user.

Location processor 815 (e.g., GNSS receiver chip) may be connected to peripherals interface 806 to provide geo-referencing. Electronic magnetometer 816 (e.g., an integrated circuit chip) may also be connected to peripherals interface 806 to provide data that may be used to determine the direction of magnetic North. Thus, electronic magnetometer 816 may be used by an electronic compass application.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips. In an embodiment, the camera has a 180° FOV and OIS. The depth sensor can include an infrared emitter that projects dots in a known pattern onto an obj ect/subj ect. The dots are then photographed by a dedicated infrared camera and analyzed to determine depth data. An embodiment, a time-of-flight (TOF) camera can be used resolve distance based on the known speed of light and measuring the time-of-flight of a light signal between the camera and an object/subject for each point of the image.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data (e.g., laser projector).

The specific design and implementation of the communication subsystem 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., WiFi, WiMax, ZigBee™), 3G, 4G, 4G LTE, code division multiple access (CDMA) networks, near field communication (NFC), Wi-Fi Direct and a Bluetooth™ network. Wireless communication subsystems 824 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 826 may be coupled to a speaker 828 and one or more microphones 830 to facilitate voice-enabled functions, such as voice recognition, voice replication, digital recording, telephony functions and beamforming.

I/O subsystem 840 may include touch controller 842 and/or another input controller(s) 844. Touch controller 842 may be coupled to a touch surface 846. Touch surface 846 and touch controller 842 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 846. In one implementation, touch surface 846 may display virtual or soft buttons, which may be used as an input/output device by the user.

Other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of speaker 828 and/or microphone 830.

In some implementations, device 800 plays back to a user recorded audio and/or video files, such as MP3, AAC, and MPEG video files. In some implementations, device 800 may include the functionality of an MP3 player and may include a pin connector or other port for tethering to other devices. Other input/output and control devices may be used. In an embodiment, device 800 may include an audio processing unit for streaming audio to an accessory device over a direct or indirect communication link.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, iOS, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers, including peer-to-peer communications with wireless accessory devices, as described in reference to FIGS. 1-6. Communication instructions 854 may also be used to select an operational mode or communication medium for use by the device, based on a geographic location of the device.

Memory 850 may include sensor processing instructions 858 to facilitate sensor-related processing and functions and recorder instructions 860 to facilitate recording functions, as described in reference to FIGS. 1-6. Other instructions can include GNSS/Navigation instructions to facilitate GNSS and navigation-related processes, camera instructions to facilitate camera-related processes and user interface instructions to facilitate user interface processing, including a touch model for interpreting touch inputs.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An apparatus comprising:
   a time of flight (TOF) sensor;
   a camera;
   a laser projection system;
   one or more processors;
   memory storing instructions that when executed by the one or more processors, cause the one or more processors to perform operations comprising:
      training a deep learning network with historical user context data;
      capturing, with at least one of the TOF sensor or the camera, context data;
      determining, with the trained deep learning network, a user preference based on the context data;
      selecting, an application, based on the user preference and the context data;
      processing, with the selected application, the context data into a presentation; and
      projecting, using the laser projection system, at least a portion of the presentation on a surface.

2. The apparatus of claim 1, further comprising:
   a global navigation satellite receiver configured to determine a geographic location of the apparatus, wherein the operations further comprise:
   generating or obtaining second data based on the geographic location; and
   projecting, using the laser projection system, at least a portion of the second data on the surface.

3. The apparatus of claim 1, further comprising:
   a biometric sensor configured to detect a heartbeat of a user and to generate heart rate data, wherein the operations further comprise:
   generating or obtaining second data based on the heart rate data; and
   projecting, using the laser projection system, at least a portion of the second data on the surface.

4. The apparatus of claim 1, further comprising:
   a biometric sensor configured to detect a fingerprint of the user and to generate fingerprint data, wherein the operations further comprise:
   generating or obtaining second data based on the fingerprint data; and
   projecting, using the laser projection system, at least a portion of the second data on the surface.

5. The apparatus of claim 1, further comprising:
   a biometric sensor configured to detect an emotional state of the user and generating emotional state data, wherein the operations further comprise:
   generating or obtaining second data based on the emotional state data; and
   projecting, using the laser projection system, at least a portion of the second data on the surface.

6. The apparatus of claim 1, further comprising:
   one or more earbuds coupled to the apparatus; and
   one or more inertial sensors included in or coupled to the earbuds and configured to provide direction data indicative of a direction the user is facing or head gestures, and wherein the operations further comprise:
   generating or obtaining second data based on the direction data; and
   projecting, using the laser projection system, at least a portion of the second data on the surface.

7. The apparatus of claim 6, wherein the direction data is used to steer the sensor in the direction that the user is facing.

* * * * *